United States Patent [19]

Lundgren

[11] 4,396,135

[45] Aug. 2, 1983

[54] TENNIS RACKET CARRIER FOR BICYCLES

[76] Inventor: Dennis E. Lundgren, P.O. Box 17185, Irvine, Calif. 92713

[21] Appl. No.: 395,592

[22] Filed: Jul. 6, 1982

[51] Int. Cl.³ .............................................. B62J 11/00
[52] U.S. Cl. ................................... 224/39; 211/60 R; 224/30 R; 224/35
[58] Field of Search .......................... 224/30 R, 35, 39; 248/68 R, 231.6, 316.8, 229; 211/60 R

[56] References Cited

U.S. PATENT DOCUMENTS

| | | | |
|---|---|---|---|
| 429,357 | 6/1890 | McBee | 248/68 R |
| 1,583,462 | 5/1926 | Hendee | 248/231.6 |
| 1,586,642 | 6/1926 | Arndt | 248/231.6 |
| 2,769,895 | 11/1956 | Boord | 248/316.8 X |
| 3,648,908 | 3/1972 | Thompson | 224/39 X |
| 3,968,912 | 7/1976 | Horwitz | 224/36 |
| 4,044,934 | 8/1977 | Peters | 224/36 |

FOREIGN PATENT DOCUMENTS

| | | | |
|---|---|---|---|
| 157149 | 9/1939 | Fed. Rep. of Germany | 224/30 R |
| 886856 | 8/1953 | Fed. Rep. of Germany | 224/39 |

*Primary Examiner*—Allan N. Shoap
*Attorney, Agent, or Firm*—Ben E. Lofstedt

[57] ABSTRACT

A tennis racket carrier for bicycles, and the like, including a T-shaped member having at least four apertures therein, each aperture disposed adjacent to the extremities of the ends of the T-shaped member, four threaded rods mounted in each of the apertures, a pair of plates having a pair of apertures adjacent to the ends of the plates adapted to be joined to the threaded rods, a pair of spacers disposed on the threaded rods between the T-shaped member and the plates to space apart the plates from the T-shaped member, a U-shaped bracket member having a pair of flanges on the ends thereof with a pair of apertures therein, a pair of threaded fasteners for securing the U-shaped member to the T-shaped member, and wing nuts for securing the plates to the threaded rods.

5 Claims, 2 Drawing Figures

TENNIS RACKET CARRIER FOR BICYCLES

BACKGROUND OF THE INVENTION

1. Field of the Invention

This invention relates to a tennis racket carrier, and, in particular, to a tennis racket carrier for a bicycle which is capable of being removably secured to the frame of a bicycle, or the like.

2. Description of the Prior Art

A number of various carriers have been developed in the past which are representative of the prior art pertaining to the present invention disclosed herein. As can well be appreciated therefore, the problem of transporting bulky, cumbersome items while riding a bicycle has been a long-standing one. The problem can be succinctly stated as follows. A bicyclist who is also a tennis player must carry both his partner's tennis racket and his own in traveling to and from a tennis court. In the absence of a tennis racket carrier, the bicyclist must awkwardly attempt to steer the bicycle to reach his destination as he tries to juggle the tennis rackets while trying to peddle and steer the bicycle. Such a process can be not only very clumsy, but, in the case of a younger person particularly, a potentially dangerous method of carrying tennis rackets.

Several innovations have appeared as solutions.

For example, U.S. Pat. No. 503,315 issued to Gendron, relates to a gun carrier for bicycles. It incorporates a two-part gun-supporting system which is quite different mechanically speaking than the present invention. Such a system could be questionably utilized for carrying a tennis racket and certainly could not be used for transporting two tennis rackets.

U.S. Pat. No. 672,540 issued to Speir relates to a gun carrying attachment for bicycles. Again, two (2) supporting brackets in order to carry a gun. A pair of bracket members are used supported by the upper cross-frame member of the bicycle to carry a single gun.

U.S. Pat. No. 3,658,908 issued to Thompson relates to a pair of spring clamps secured to a bicycle frame for carrying a fishing rod.

U.S. Pat. No. 3,968,912 issued to Horwitz relates to a tennis ball and tennis racket carrier. Structurally speaking, it is quite different than the present invention and would seem to be somewhat hazardous in the event that the bicyclist were to plummet over the handlebars of the bicycle if the bicycle came to a stop suddenly.

U.S. Pat. No. 4,044,934 issued to Peters relates to a tennis racket carrier and tennis ball carrier which is secured to the forks of the front wheel assembly of the bicycle. A potential hazard exists in the event that the bicyclist is thrown forward in the event of a rapid or unexpected stop.

With respect to U.S. Pat. No. 3,967,475 issued to Zane, this relates to a combination bicycle lock and mounting bracket to secure a bicycle to another member in order to reduce, if not eliminate, the likelihood of theft of the bicycle. It does not teach the carrying or transportation by the bicycle of another object.

All of the above-described prior art devices fail to permit the carrying of one or two tennis rackets supported by an adjustable bracket support secured to the cross-frame member of the bicycle. As a result, the present invention provides a low-cost, convenient means of transporting the tennis rackets while bicycling without posing a hazard to the bicyclist.

SUMMARY OF THE INVENTION

Basically, the present invention, referred hereinto as a tennis racket carrier for bicycles, comprises a tennis racket carrier for bicycles, and the like, including a T-shaped member having at least four apertures therein, each aperture disposed adjacent to the extremities of the ends of the T-shaped member, four threaded rods mounted in each of the apertures, a pair of plates having a pair of apertures adjacent to the ends of the plates adapted to be joined to the threaded rods, a pair of spacers disposed on the threaded rods between the T-shaped member and the plates to space apart the plates from the T-shaped member, a U-shaped bracket member having a pair of flanges on the ends thereof with a pair of apertures therein, a pair of threaded fasteners for securing the U-shaped member to the T-shaped member, and wing nuts for securing the plates to the threaded rods.

It is one object of the present invention to provide a means for transporting one or two tennis rackets via a bicycle to and from a tennis court.

Another object of the instant invention is to utilize a single bracket support member secured to the cross-frame member of a bicycle for carrying one or two tennis rackets.

It is yet a still further object of this invention to provide a safe, but necessarily simple and readily accomplished, method of transporting one or two tennis rackets via a bicycle or similar wheeled vehicle.

Other objects, advantages, and applications of the present invention will become apparent to those skilled in the art of tennis racket carriers for bicycles and the like when the accompanying description of one example of the best mode contemplated for practicing the invention is read in conjunction with the accompanying drawings.

BRIEF DESCRIPTION OF THE DRAWINGS

The description herein makes reference to the accompanying drawing wherein like reference numerals refer to like parts throughout the several views, and in which.

DESCRIPTION OF THE PREFERRED EMBODIMENT

Figure 1:
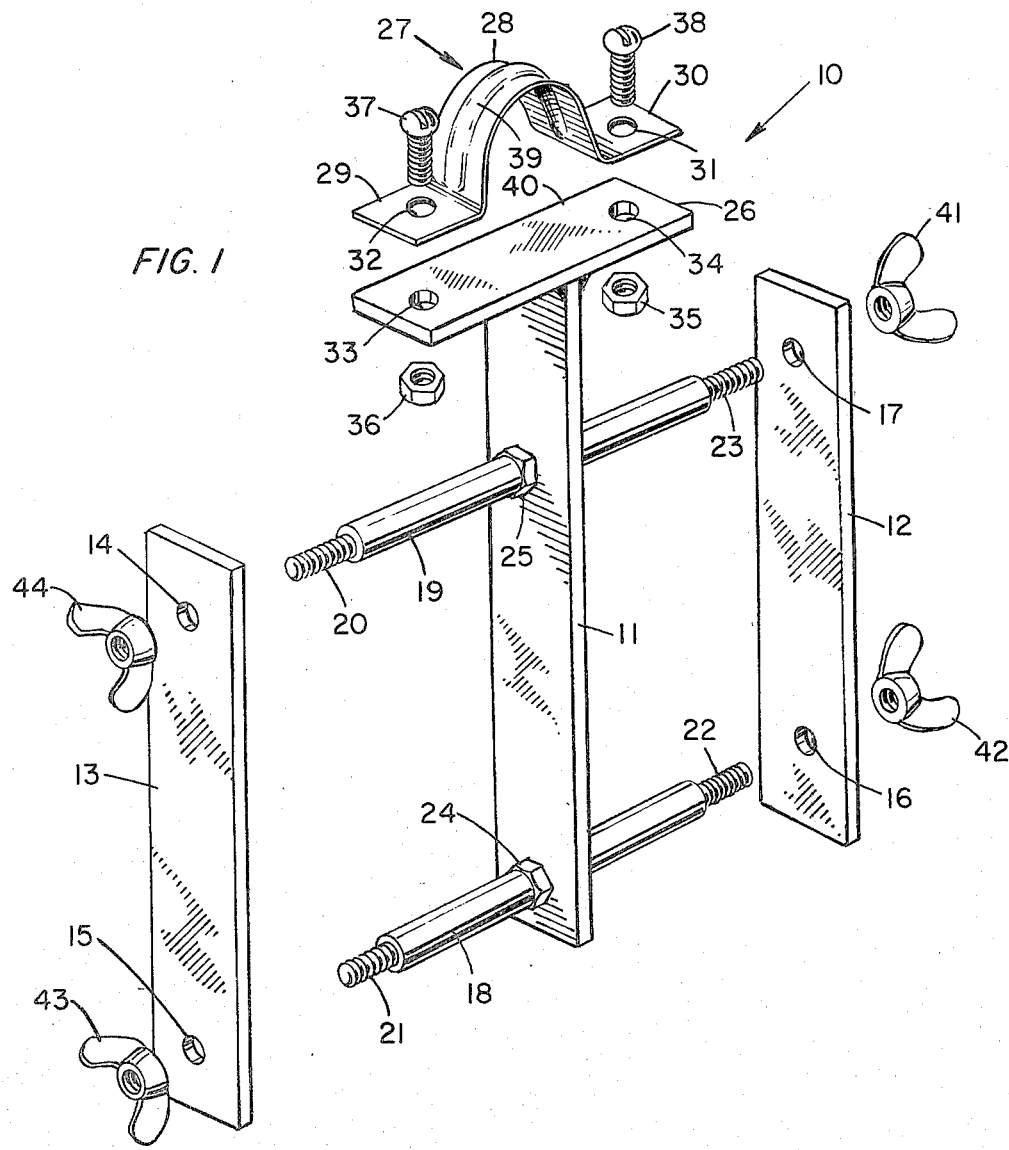
FIG. 1 is an exploded assembly view of the present invention.

Referring now to the drawings herein, and, in particular, to FIG. 1 wherein there is illustrated one example of the present invention in the form of a tennis racket carrier 10 which is used for holding one or two tennis rackets 53, 54 and which are mounted in a manner to be described hereinafter in greater detail to the cross-member 49 of a bicycle, generally indicated at 45.

Fundamentally, the instant invention 10 includes a T-shaped member which includes a vertically-arranged elongated member 11 and a top member 26 which are typically secured in fixed relationship to one another to form the T-shaped member by welding, brazing or the like. Both members 11 and 26 have a pair of apertures near the extremities. The apertures in the top member 26 are identified as 33 and 34. The pair of apertures are not shown in the drawing in the member 11 but, as can be clearly seen, are present to allow the threaded rods 20, 23 and 21, 22 to pass therethrough. A pair of nuts 24, 25 are used to fixedly establish the relationship of the threaded rods 20, 23 and 21, 22 to the member 11. Another pair of nuts, not shown, may be used on the opposite side of the member 11 to complete the fixed securement of the rods 20, 23 and 21, 22 to the member 11.

Spacers 18, 19 consisting of a plurality of tubes are passed over the threaded rods 20, 23 and 21, 22, the purpose and function of which will become clearer as the description of the invention proceeds further herein.

A pair of plates 12, 13 each having a pair of apertures 16, 17 and 14, 15, respectively, adjacent to the ends of the plates 12, 13. The pair of plates 12, 13 are joined to the threaded rods 22, 23 and 20, 21 respectively and secured thereto by a plurality of wing nuts 41, 42 and 43, 44 respectively. Once the wing nuts 41, 43 and 43, 44 are tightened, the plates 12, 13 are forced into intimate abuttment with the spacers 18, 19 to maintain the plates in fixed spaced relationship to the member 11.

A U-shaped bracket member 27 having a pair of flanges 29, 30 on the ends thereof with a pair of apertures 31, 32 therein is correspondingly matingly secured to the top member 26 via threaded bolts 37, 38 and nuts 35, 36 passed through the corresponding apertures 31, 32 and 34, 33, respectively.

The various functions of the apparatus herein disclosed and discussed will become more understandable when considered in conjunction with the description of the operation of the invention set forth herein.

OPERATION OF THE INVENTION

Figure 2:
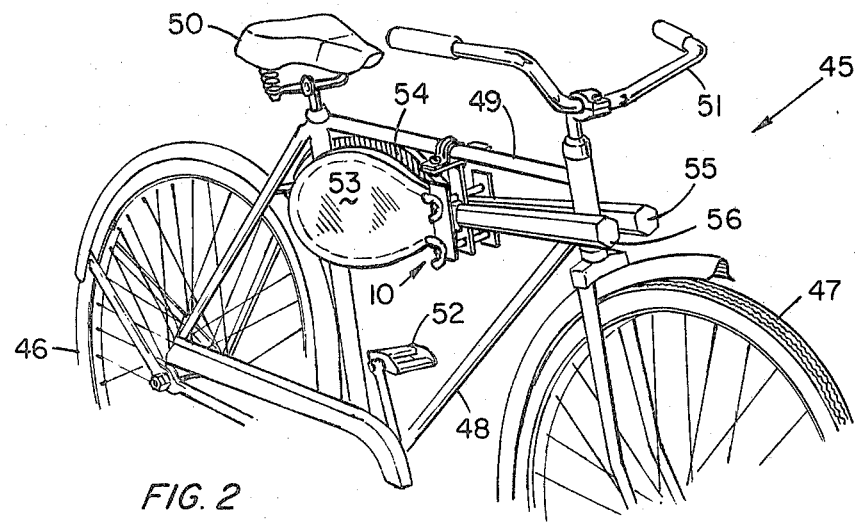
FIG. 2 is a view of the present invention shown affixed to the bicycle and carrying a pair of tennis rackets.

With special emphasis now on FIG. 2 of the drawings, there is shown the invention 10 secured in position on a bicycle 45 carrying two (2) tennis rackets 53 and 54.

As seen from this illustration, the handles 55 and 56 of each of the tennis rackets 53 and 54 are secured mediately about the handles 55 and 56 with the invention 10 which in turn is secured to the cross-member 49 of the bicycle 45.

To use the invention 10, it is first secured to the bicycle's cross-member 45 by disengaging the U-shaped bracket member 27 from the top member 26 by removing the threaded bolts 37, 38 and nuts 35, 36. The U-shaped bracket member 27 is then positioned above the bicycle's cross-member 45 so that the pair of flanges 29, 30 extend laterally therefrom in a substantially horizontal fashion. The top member 26 is then aligned with the flanges 29, 30 so that the apertures 31, 32 are complementarily and operably arranged with the apertures 33, 34 in the top member 45. Once this is accomplished, the threaded bolts 37, 38 are passed through the apertures 31, 32, 33, and 34 and thereafterwards secured via nuts 35 and 36 to form a securely anchored unit to the bicycle's cross-member 49.

To install the tennis rackets 53, 54 in the tennis racket carier 10, the wing nuts 41, 42, 43 and 44 are removably disengaged from the threaded rods 22, 23 and 20, 21. Thereafterwards, the pair of plates 12, 13 are removed and separated from the rods 22, 23 and 20, 21. The handles 55 and 56 of the tennis rackets 53, 54 are then nestingly positioned against the member 11 and disposed between the threaded rods 22, 23 and 20, 21 and the pair of plates 12, 13 re-joined to the rods 22, 23 and 20, 21 and the wing nuts 41, 42, 43 and 44 re-installed to the rods 22, 23 and 20, 21. This securely captures the tennis rackets 53, 54 in place.

It should be noted that the spacers 18, 19 and its complementary pair of spacers on the opposite ends of the rods 20 and 21 serve not only to prevent the plates 12, 13 from passing beyond the ends of said spacers 18, 19 and its complementary pair of spacers, but covers the sharp edges of the threaded unused portions of the rods 22, 23 and 20, 21 and prevents damage to the handles 55, 56 of the tennis rackets 53, 54.

Of course, it should also be clearly understood that these spacers 18, 19 and its complementary spacers could be eliminated by employing a rod which is only threaded at its extremities for such a length along the rod to accommodate threaded engagement with the wing nuts 41, 42, 43 and 44 after the installation of the plates 12, 13. Such would, of course, perform all of the functions of the spacers now used.

As employed, this invention 10 provides a single bracket means secured to the cross-member 49 of the bicycle 45 to carry one or two tennis rackets 53, 54. The ends of the tennis racket handles 55, 56 are so disposed forwardly of the bicycle 45 so as to place them in a safe position so that in the event of a rider fall, the rider is not injured by coming into contact therewith.

While only one example of the present invention has been disclosed, it should be apparent to those skilled in the art of tennis racket carriers and the like for bicycles and similar vehicles, that other forms may be had, all coming within the spirit of the invention and scope of the appended claims.

What is claimed is:

1. A tennis racket carrier for bicycles having a cross-member disposed between the rider's seat and the steering column and the like, comprising:
   (a) a T-shaped member having at least four apertures therein, each aperture disposed adjacent to the extremities of said T-shaped member;
   (b) a pair of rods mounted in the pair of apertures in the vertical portion of the T-shaped member, each of said rods having a pair of complementary ends thereon which are threaded, said rods being spaced apart to permit the handle of a tennis racket to be disposed therebetween;
   (c) a pair of plates having a pair of apertures adjacent the ends of said plates and arranged to be engaged with the ends of said pair of rods so as to be mounted thereto;
   (d) spacer means mediately disposed on said rods to prevent the plates from contacting said vertical portion of said T-shaped member;
   (e) bracket means adapted to be conformably mounted to the cross-member of said bicycle, and further having a pair of laterally-disposed flanges with apertures therein, said apertures arranged in complementary relationship to the pair of apertures in the horizontal portion of the T-shaped member;
   (f) threaded nut means for engagement with the threaded ends of said rods for securing said plates thereto; and
   (g) fastening means for securing the flanges of said bracket means to the top of said T-shaped member thereby securing said T-shaped member to said bracket means whereby said bracket means is operably joined with and supported by said cross-member of said bicycle.

2. The tennis racket carrier of claim 1 wherein said spacer means are composed of a pair of sleeves passed over the rods.

3. The tennis racket carrier of claim 1 wherein said bracket means comprises a substantially U-shaped member with a pair of apertured flange portions extending laterally therefrom.

4. The tennis racket carrier of claim 1 wherein said threaded nut means are wing nuts or the like.

5. The tennis racket carrier of claim 1 wherein said fastening means for securing the flanges of said bracket means to the top of said T-shaped member to said bracket means comprises a pair of threaded bolts and nuts.

* * * * *